May 9, 1939.                C. W. SHAW                2,157,635
                          VENTING DEVICE
                        Filed Aug. 22, 1936

INVENTOR.
CLARENCE W. SHAW
BY Hivis, Hudson & Kent.
ATTORNEYS

Patented May 9, 1939

2,157,635

UNITED STATES PATENT OFFICE 2,157,635

VENTING DEVICE

Clarence W. Shaw, Detroit, Mich., assignor, by mesne assignments, to Eaton Manufacturing Company, Cleveland, Ohio, a corporation of Ohio Application August 22, 1936, Serial No. 97,438

1 Claim. (Cl. 220—44)

This invention relates to an improved venting device for liquid containers, such as the fuel tanks of motor vehicles, and more particularly to venting means of this character which is adapted to be readily incorporated in a tank filler cap.

The present invention is directed to the correction of a certain difficulty heretofore experienced in connection with the fuel tanks of motor vehicles. In many motor vehicles the fuel tank air vent is located in the tank filler cap and in some instances this cap is only a few inches above the top of the tank. When a vehicle is traveling in a curved path, as for instance in turning a corner, the fuel level assumes an angle to the horizontal substantially proportional to the angular velocity of the vehicle. Under this condition, the fuel level may tend to rise above the level of the filler cap and some of the fuel may be forced through the vent opening, with a resulting loss of fuel and an unsightly collection of dirt on the vehicle structure adjacent the filler cap. I have been able to correct this difficulty by the provision of an improved venting means which offers material resistance to the flow of fuel out through the vent yet allows sufficient air to enter the tank to accommodate the maximum displacement of fuel therefrom.

In arriving at a solution to the above problem, I have observed that fuel tank vents are usually in the form of an opening punched through a relatively heavy sheet metal section of the filler cap. In the manufacture of such caps, it is not practical to punch a vent opening of a diameter less than .060 to .080 inch, or .004 to .005 square inch in area, whereas I find that the size of vent opening actually required for a motor vehicle of approximately 100 brake horsepower is in the neighborhood of a hole .025 inch in diameter or of approximately .0005 square inch in area. Although vent openings of .025 inch in diameter could be formed by drilling this operation would be costly and unsatisfactory in commercial production. Furthermore, a drilled or punched vent opening of approximately .025 inch in diameter would frequently become clogged by dust, gum deposits from the gasoline, or other substances.

It is, therefore, an object of the present invention to provide improved venting means for fuel or other liquid containing tanks which will readily permit air to enter the tank at all times but will offer material resistance to the flow of liquid out of the tank.

Another object of the invention is to provide improved venting means, of the type referred to, having a vent aperture of a size adapted to be economically formed, as by punching, and wherein novel means is provided for restricting the area of such vent opening.

Still another object of my invention is to provide novel venting means for fuel containers, or the like, comprising a vent aperture and a member disposed in the aperture for restricting the area thereof but which is free to tilt, reciprocate, and rotate therein.

Yet another object of my invention is to provide improved vent means, of the type referred to, wherein the restricting member is a metering pin having a stem portion disposed in the vent aperture and an offset portion adapted to cause rotation of the stem portion as the result of interia acting on the device.

It is also an object of my invention to provide an improved closure for fuel tanks, or the like, comprising a pair of members connected to provide a vent chamber therebetween which communicates with the tank through a vent aperture and wherein a member shiftable in said chamber has a portion thereof disposed in the aperture for reducing the area thereof.

Other objects and advantages of the invention will be apparent from the following description when taken in conjunction with the accompanying sheet of drawings in which.

I have already indicated that my improved venting means may be applied to fluid containing tanks in general, but since it is particularly adaptable to the fuel tanks of motor vehicles and to filler caps therefor, I have illustrated my invention in a form applicable to such tanks, but it will be understood, of course, that this is by way of example only and that the invention may be embodied in other structures and applied to other uses.

Figure 1:
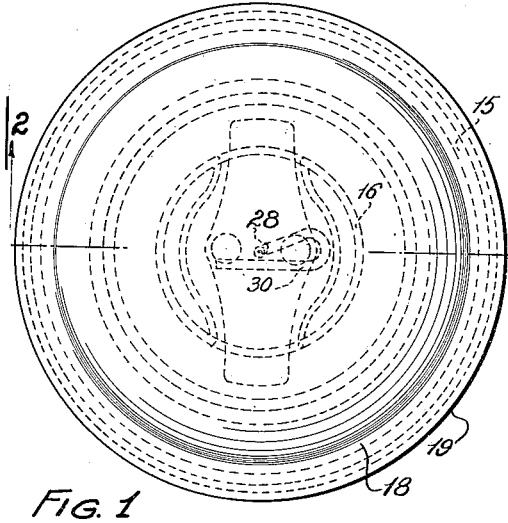
Fig. 1 is a top plan view of a tank filler cap having my novel venting device embodied therein.
Figure 2:
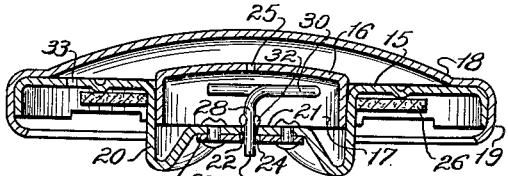
Fig. 2 is a transverse sectional view thereof taken as indicated by line 2—2 of Fig. 1.

In Figs. 1 and 2 of the drawing I show my novel venting means incorporated in a filler cap of the bayonet or quick-detachable type. The filler cap illustrated in this instance has a cap body comprising inner and outer members 15 and 16 which are so formed and connected as to provide therebetween a vent chamber 17. The cap may also include an outer shell 18, of more or less ornamental form, which is mounted on the member 15 and secured thereto by crimping of its depending marginal flange or skirt 19. The member 15 is constructed with a depending hollow central portion or pilot cup 20 having a bottom wall 21 which is provided with a vent aperture 22. A transverse resilient locking member 23 is riveted or otherwise connected with such bottom wall and has an aperture 24 therein which registers with the vent aperture 22 but which is preferably of larger diameter to facilitate assembly of the parts without obstruction of the vent aperture. The member 16 may be a cup-like cover member which is assembled into the upper end of the pilot cup portion 20 of the member 15 and may also be provided with a vent aperture 25. In addition to carrying the locking member 23, the depending pilot cup portion 20 also provides a locating means for the surrounding gasket 26.

The parts 15 and 16, as well as the outer shell 18 and the locking member 23, are formed as stamped sheet metal parts, and the vent apertures 22 and 24 are preferably formed by punching operations and hence are usually .060 to .080 inch in diameter or larger. According to my invention, I provide novel means for restricting the area of one of the vent apertures so that material resistance will be offered to the flow of fuel out through the vent, yet sufficient air will be allowed to readily enter the tank to accommodate the maximum displacement of fuel therefrom. This restricting means may be in the form of a metering pin or member 28 having a portion thereof disposed in one of the vent apertures to substantially fill the same but which portion is movable in the vent aperture to prevent clogging thereof by dirt, gum deposit, or other substance.

Figure 11:
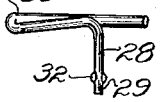
Figs. 11 and 12 are detached side and end elevational views, respectively, further illustrating one form of my vent restricting member.
Figures 12, 13:
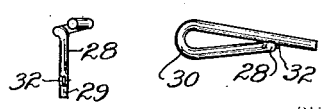
Fig. 13 is a plan view thereof.

In this instance, the member 28 is disposed in the vent chamber 17 and has a stem portion 29 extending through the vent aperture 22. To obtain frequent movement of the stem portion in the vent aperture to prevent clogging thereof, I provide the member 28 with one or more laterally offset integral arm portions 30, which will, as the result of inertia or gravity forces acting thereon, cause tilting or rotation of the stem portion in the vent aperture in response to movements of the vehicle or tank on which the venting device may be used. The member 28 may be formed from wire of suitable characteristics, as by bending the wire to provide the stem portion 29 and the arm portions 30. As shown in the drawing, particularly in Figs. 11, 12 and 13, the wire may be bent so that the arm portions 30 extend laterally at substantially right angles to the axis of the stem portion and such that the member is substantially T-shaped. The size of the stem portion 29 with relation to the vent aperture 22 will depend upon the conditions and characteristics of the particular fuel system, but I have found that in passenger cars, for example, the stem portion should have a diameter about .005 inch less than the vent aperture where the latter is approximately .080 inch in diameter.

Figures 9, 10:
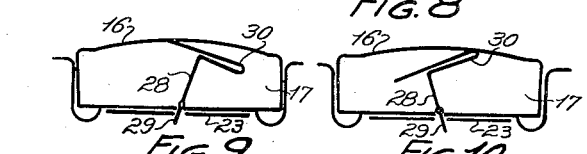
Figs. 9 and 10 are sectional views, more or less diagrammatic in form, illustrating how the tilting of the vent restricting member is limited by engagement of that member with portions of the cap structure.

The extent to which the stem portion 29 of the member 28 may extend through the vent aperture 22 may be limited, as by pinching the stem portion to provide enlargements or stops 32 thereon. In thus limiting the extent to which the stem portion 29 may extend through the vent aperture, these stops support the member 28 in an upstanding position so that it may be readily rotated in the vent aperture as the result of inertia acting on the arm portions 30, and such that it will be relatively unstable and highly susceptible to tilting as the result of movements of the vehicle or tank on which it is used. The member 28 is so proportioned relative to the spacing of the part 16 from the transverse bottom wall 21 that one or both of the arm portions 30 will engage such part and prevent withdrawal of the stem portion 29 from the vent aperture. The arm portions 30 of the member 28 are preferably of such length that the desired rotation of the stem portion 29 in the vent aperture will be obtained as the result of inertia, and also such that one or the other of the arms will engage the member 16 upon tilting of the device, as illustrated in Figs. 9 and 10, to prevent binding of the stem portion in the vent aperture.

From the arrangement as thus described it will be seen that when the closure cap of Figs. 1 and 2 is applied to the fuel tank of a motor vehicle the vent chamber 17 of the cap will have restricted communication with the fuel tank through the opening 22 and will have communication with the atmosphere through the opening 25 and an opening 33 provided in the member 15 outwardly of the gasket 26. As the result of starting and stopping of the vehicle and other movements thereof, the member 28 will be subjected to more or less "jiggling", tilting, and rotation which will cause movement of the stem portion 29 in the vent aperture so as to insure against clogging of the vent passage.

Figure 3:
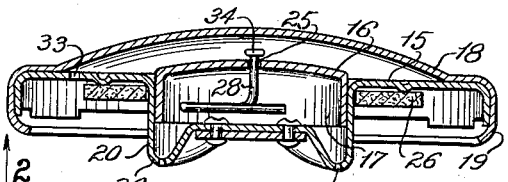
Fig. 3 is a similar transverse sectional view taken through another cap of similar construction but showing a modified arrangement of my venting device.

It is not necesary to the attainment of the beneficial results of my invention that the metering pin or vent restricting member be mounted in the position illustrated in Fig. 2, but, if desired, this member may be disposed in the vent aperture 25 of the member 16, as illustrated in Fig. 3. When disposed in the upper vent opening 25, the member 28 is suspended in the vent chamber 17 and its stem portion is provided with a deformed part 34 which prevents withdrawal of the stem from the vent aperture. In this venting arrangement provision is made for connecting the vent chamber 17 with the interior of the tank by forming vent apertures 35 at the low points of the arcuately extending projections 36 of the pilot cup 20.

Figure 4:
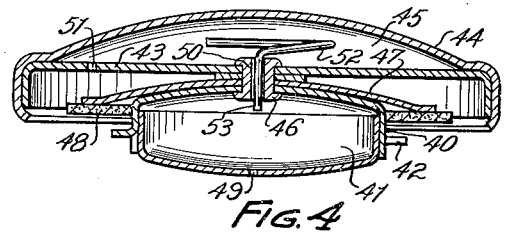
Fig. 4 is a transverse sectional view taken through another form of filler cap and showing my venting means embodied therein.

In Fig. 4 of the drawing I have shown my novel venting means embodied in another form of closure cap which may be used on a vehicle fuel tank or other container. This cap is of the type having an inner structure 40 containing a vent chamber 41 and carrying a pair of substantially rigid locking fingers 42. The cap may also include an outer structure comprising a disk-like member 43 and a more or less ornamental shell 44 mounted thereon. The members 43 and 44 preferably have portions thereof spaced apart to provide an outer vent chamber 45. The inner and outer cap structures are connected by means of a hollow rivet 46, or the like, which permits the inner structure to be driven by rotative force applied to the outer structure. A bowed resilient disk 47 is retained between the inner and outer structures by the connecting member 46 and serves to press the sealing gasket 48 against the tank or neck structure when the locking cams of the latter are engaged by the fingers 42. The vent chamber 41 communicates with the interior of the tank through a vent aperture 49 formed in the bottom wall of the inner structure and communicates with the outer vent chamber through the passage 50 of the connecting member 46. The outer vent chamber may be connected with atmosphere by a vent aperture 51 formed in the member 43.

In embodying my novel venting arrangement in a closure cap of the type illustrated in Fig. 4, I associate a metering pin or vent restricting member 52 with one of the vent openings, preferably with the passage 50 of the connecting member 46. In this instance the restricting member has a stem portion 53, which materially reduces the area of the passage 50 and which is freely movable therein as the result of rotation or tilting of this member.

Figure 5:
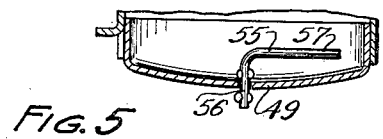
Fig. 5 is a partial sectional view of a filler cap of the form represented in Fig. 4, but showing another manner of incorporating my venting device therein.

Instead of the vent restricting member or metering pin being disposed in the passage of the connecting member 46, as just explained, it may be disposed in the vent aperture 49, as illustrated in Fig. 5. When the restricting member is disposed in the vent aperture 49, this member may be a metering pin 55 of the somewhat simpler form illustrated in Fig. 5 where it is shown as having a stem portion 56 and a single laterally extending integral arm 57.

Figure 6:
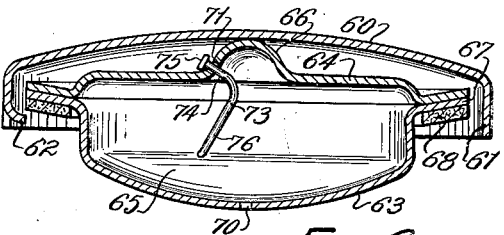
Fig. 6 is a transverse sectional view taken through another form of filler cap and showing my venting device embodied therein.

In Fig. 6 of the drawing I show my novel venting means embodied in still another form of closure cap, such cap being of the type known as an outside cam closure. This closure cap may comprise an outer shell or structure 60 having a depending skirt 61 provided with inwardly extending locking lugs 62, and an inner structure formed by members 63 and 64. The latter members are preferably arranged and shaped to provide a vent chamber 65 therebetween and a fulcrum button or the like 66 which engages the outer member 60 substantially centrally thereof. The members 63 and 64 also provide annular flange means 67 for cooperation with a sealing gasket 68.

In embodying my novel venting means in the outside cam closure of Fig. 6, the inner structure is provided with lower and upper vent apertures 70 and 71 which connect the vent chamber respectively with the interior of the tank and the atmosphere. A metering pin is disclosed in one of these vent openings, and when it is disposed in the upper vent opening, this member may be in the form of the element 73. This restricting element 73 has a stem portion 74 substantially filling the vent opening and prevented against withdrawal therefrom by a deformed portion 75. This restricting element also has an angularly extending arm portion 76 which tends to cause movement of the stem portion 74 in the vent aperture as the result of movements of the closure cap.

Figure 7:
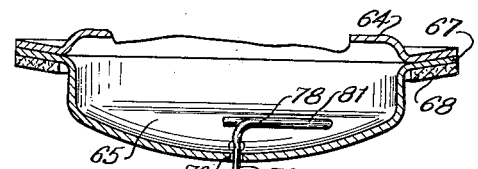
Fig. 7 is a partial sectional view, similar to that of Fig. 6, but showing another arrangement for the venting means.

When the metering pin is disposed in the lower vent opening 70, it may be in the form of the restricting member 78 shown in Fig. 7. This member has a stem portion 79 extending through and substantially filling the vent aperture and held against withdrawal therefrom by the enlargement 80. The restricting member 78 also has a laterally extending arm portion 81 which unbalances the member and tends to cause tilting or rotation of the stem portion in the vent aperture.

Figure 8:
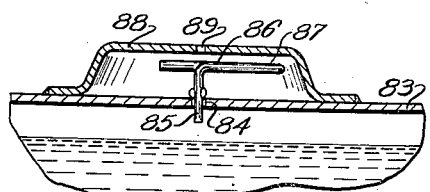
Fig. 8 is a partial transverse sectional view showing a simplified arrangement for my venting device and illustrating the application thereof to a fuel tank.

In Fig. 8 of the drawing I have shown my venting device applied to the wall of a fuel tank or other liquid container. In this arrangement the tank wall 83 is provided with a vent aperture 84 in which the stem portion 85 of a metering pin or restricting member 86 is disposed. This member also has bent portions providing laterally extending arms 87 tending to unbalance the same and to cause rotation or tilting of the stem portion in the vent aperture. This venting arrangement may also include a cup-like member 88 which is mounted on the tank wall 83 in the manner of a cover extending over the vent aperture 84 and the metering pin 86. The member 88 limits the tilting of the member 86 and prevents the stem portion 85 of the latter from being withdrawn from the vent aperture. The member 88 may have an aperture 89 therein leading to atmosphere.

From the foregoing description and the accompanying drawing it will now be readily seen that I have provided a novel venting arrangement for liquid containing tanks and which may readily be embodied in closure caps for the filling openings of such tanks. It will be understood further that my novel venting means includes a metering pin or restricting member having a portion thereof disposed in a vent aperture to materially restrict the same. Since this restricting member or metering pin is of a form which is normally unbalanced or unstable, it is adapted to be tilted and rotated in the vent aperture as the result of movements of the tank or vehicle and thus prevents clogging of the vent passage.

While I have illustrated and described the novel venting device of my invention in a somewhat detailed manner, it will be understood, of course, that I do not wish to be limited to the precise details and arrangements disclosed but regard my invention as including such changes and modifications as do not involve a departure from the spirit of the invention and the scope of the appended claim.

Having thus described my invention, I claim:

In a closure for fuel tanks or the like, the combination of a cap member having substantially centrally thereof a cup-like portion provided with a transverse bottom wall, a cover member cooperating with said cup-like portion for defining a vent chamber therein, said bottom wall having a vent aperture communicating with said chamber and located substantially on the central axis of the closure, and a metering element having a stem portion disposed in said aperture for materially reducing the area thereof, said element being tiltable and rotatable in said chamber and having laterally extending portions engageable with said cover member for limiting the tilting movement and for preventing withdrawal of the stem portion from said aperture.

CLARENCE W. SHAW.